United States Patent
Yu

(10) Patent No.: US 10,924,348 B1
(45) Date of Patent: Feb. 16, 2021

(54) SPLIT DECISION TREES ON CLIENT AND SERVER

(71) Applicant: Jiayao Yu, Venice, CA (US)

(72) Inventor: Jiayao Yu, Venice, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/392,902

(22) Filed: Apr. 24, 2019

(51) Int. Cl.
    *H04L 12/24* (2006.01)
(52) U.S. Cl.
    CPC ...... *H04L 41/0893* (2013.01); *H04L 41/0823* (2013.01); *H04L 41/0883* (2013.01); *H04L 41/22* (2013.01)
(58) Field of Classification Search
    CPC . H04L 41/0893; H04L 41/0883; H04L 41/22; H04L 41/0823
    See application file for complete search history.

(56) References Cited

U.S. PATENT DOCUMENTS

| | | | | |
|---|---|---|---|---|
| 10,592,554 B1 * | 3/2020 | Merritt | ................ | G06F 16/9027 |
| 2006/0047640 A1 * | 3/2006 | Ono | ........................ | H04L 67/28 |
| 2008/0010231 A1 * | 1/2008 | Perazolo | ................ | G06N 5/025 |
| | | | | 706/48 |
| 2015/0254572 A1 * | 9/2015 | Blohm | .................... | G06N 20/00 |
| | | | | 706/12 |
| 2015/0379426 A1 * | 12/2015 | Steele | .................... | G06N 20/00 |
| | | | | 706/12 |
| 2016/0182356 A1 * | 6/2016 | Mann | ....................... | H04L 45/14 |
| | | | | 709/223 |
| 2019/0122294 A1 * | 4/2019 | Pendleton | ........... | G07F 17/3237 |
| 2019/0316909 A1 * | 10/2019 | White | ...................... | G06N 5/02 |
| 2020/0126012 A1 * | 4/2020 | Bailey | .................... | G06N 7/005 |

* cited by examiner

*Primary Examiner* — Arvin Eskandarnia
*Assistant Examiner* — Chhian (Amy) Ling
(74) *Attorney, Agent, or Firm* — Culhane Meadows PLLC; Stephen J. Weed

(57) ABSTRACT

Systems, devices, media and methods are presented for splitting decision trees between server and client. The client of the systems and methods sends a configuration query. The server of the system and method receives the configuration query. The server retrieves Config rule(s) according to the configuration query. Each of the Config rule(s) can be represented by decision tree(s). The server evaluates the decision tree(s). If a definitive True or False cannot be derived from the evaluation using server knowledge, the server prunes the decision tree(s) and returns them to client side for further evaluation.

17 Claims, 7 Drawing Sheets

SPLIT DECISION TREES ON CLIENT AND SERVER

TECHNICAL FIELD

Examples of the present disclosure relate generally to configuring clients by servers. More particularly, but not by way of limitation, the present disclosure addresses efficiently responding to client configuration queries by splitting configuration decisions between the server and the client.

BACKGROUND

For web-based internet services constantly used by a vast number of users, such as content streaming, a best user experience must take into account the differences of each user's attributes, such as the device type, operating system and user preferences, etc. Intelligence and smart configuration decisions need to be made with regard to the circumstances of the user. Smart decisions need knowledge with regard to if, when and where to enable certain features and how far to push those features. To do so, client configurations are used in networks to specify the properties of the client. Each client endpoint may have its own name, address, and contact, which clients use to connect to service endpoint.

BRIEF DESCRIPTION OF THE DRAWINGS

To easily identify the discussion of any particular element or act, the most significant digit or digits in a reference number refer to the figure number in which that element is first introduced.

In the drawings, which are not necessarily drawn to scale, like numerals may describe similar components in different views. Like numerals having different letter suffixes may represent different instances of similar components. Some examples are illustrated by way of example, and not limitation, in the figures of the accompanying drawings in which.

DETAILED DESCRIPTION

The evaluation of the client configuration decision is split between the client and server. This allows for more clients to be handled on the server, with an adaption in the last milliseconds based on client-side evaluations. Thus, a decision tree can be combined with real time sensor information to provide improved client configurations.

In the conventional art, client querying configurations are often made at the server end and pushed to the client. To facilitate the configuration decision making, clients often need to provide real time information requested by the server over the internet, which increases the burden of the server, depletes server resources, and prolongs the amount of time for the users to be properly configured. As such, there is a need to reduce the total time for rendering client configuration decisions.

The description that follows includes systems, methods, techniques, instruction sequences, and computing machine program products illustrative of examples of the disclosure. In the following description, for the purposes of explanation, numerous specific details are set forth in order to provide an understanding of various examples of the inventive subject matter. It will be evident, however, to those skilled in the art, that examples of the inventive subject matter may be practiced without these specific details. In general, well-known instruction instances, protocols, structures, and techniques are not necessarily shown in detail.

Figure 1:
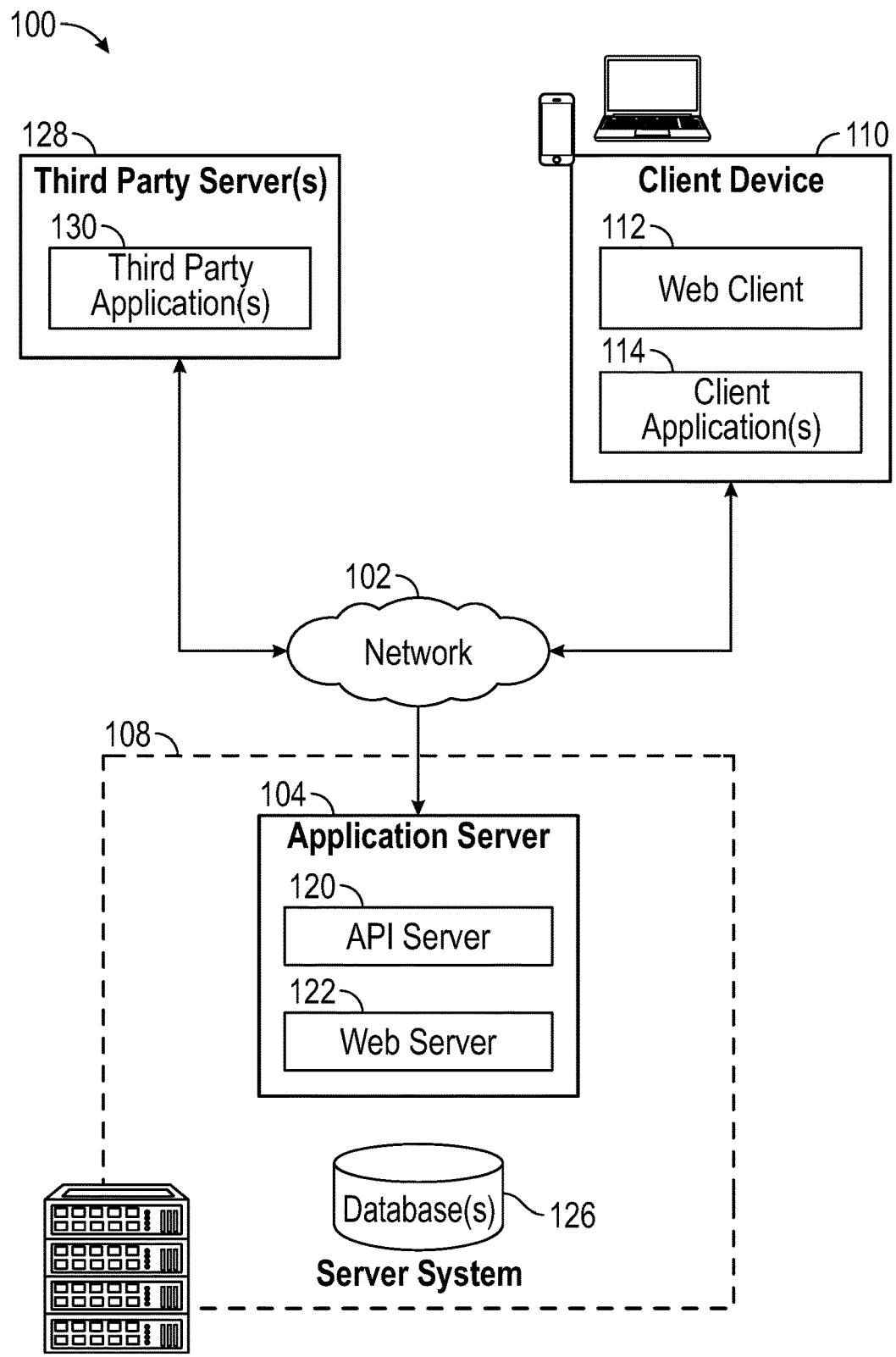
FIG. 1 is a block diagram showing a system, according to some examples of splitting decision trees between server and client.

FIG. 1 is a block diagram illustrating a system 100, according to some examples of splitting decision trees between server and client. The system 100 includes one or more client devices 110. The client device 110 includes, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, or any other communication device that a user may utilize to access the system 100. In some examples, the client device 110 includes a display module (not shown) to display information (e.g., in the form of user interfaces). In further examples, the client device 110 includes one or more of touch screens, accelerometers, gyroscopes, cameras, microphones, global positioning system (GPS) devices, and so forth. The client device 110 may be a device of a user that is used to access and utilize an online social platform. For example, the client device 110 may be used to input information to create an account, send request for online content and query for server configuration over a network 102, receive configuration decisions and queried contents, and so forth.

For example, client device 110 is a device of a given user who would like to access social media content, such as video streaming. Client device 110 accesses the website of the online social platform, such as one hosted by server system 108. Server system 108 receives the request and provide the requested content with configuration instructions.

One or more users may be a person, a machine, or other means of interacting with the client device 110. In examples, the user may not be part of the system 100 but may interact with the system 100 via the client device 110 or other means. For instance, the user may provide input (e.g., touch screen input or alphanumeric input) to the client device 110 and the input may be communicated to other entities in the system 100 (e.g., third-party servers 130, server system 108, etc.) via the network 102. In this instance, the other entities in the system 100, in response to receiving the input from the user, may communicate information to the client device 110 via the network 102 to be presented to the user. In this way, the user interacts with the various entities in the system 100 using the client device 110.

The system 100 further includes a network 102. One or more portions of network 102 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a 3G, 4G, 4G LTE and 5G network, another type of network, or a combination of two or more such networks.

The client device 110 may access the various data and applications provided by other entities in the system 100 via web client 112 (e.g., a browser) or one or more client applications 114. The client device 110 may include one or more client application(s) 114 (also referred to as "apps") such as, but not limited to, a web browser, messaging application, electronic mail (email) application, an e-commerce site application, a mapping or location application, an online social media application and the like.

In some examples, one or more client application(s) 114 are included in a given one of the client device 110, and configured to locally provide the user interface and at least some of the functionalities, with the client application(s) 114 configured to communicate with other entities in the system 100 (e.g., third-party server(s) 128, server system 108, etc.), on an as-needed basis, for data processing capabilities not locally available (e.g., to access location information, to authenticate a user, etc.). Conversely, one or more client application(s) 114 may not be included in the client device 110, and then the client device 110 may use its web browser to access the one or more applications hosted on other entities in the system 100 (e.g., third-party server(s) 128, server system 108, etc.).

A server system 108 provides server-side functionality via the network 102 (e.g., the Internet or wide area network (WAN)) to: one or more third-party server(s) 128, and one or more client devices 110. The server system 108 includes one or more application server(s) 104. Application servers(s) 104 may include one or more application program interface (API) server 120 and/or web server 122, that may be communicatively coupled with one or more database(s) 126. The one or more database(s) 126 may be storage devices that store data related to users of the server system 108, applications associated with the server system 108, cloud services, and so forth. The one or more database(s) 126 may further store information related to third-party server(s) 128, third-party application(s) 130, client device 110, client application(s) 114, users, and so forth. In one example, the one or more database(s) 126 may be cloud-based storage.

The server system 108 may be a cloud computing environment, according to some examples. The server system 108, and any servers associated with the server system 108, may be associated with one or more cloud-based application(s), in one example.

The system 100 further includes one or more third-party server(s) 128. The one or more third-party server(s) 128 may include one or more third-party application(s) 130. The one or more third-party application(s) 130, executing on third-party server(s) 128 may interact with the server system 108 via API server 120 via a programmatic interface provided by the API server 120. For example, one or more the third-party applications 132 may request and utilize information from the server system 108 via the API server 120 to support one or more features or functions on a website hosted by the third-party or an application hosted by the third-party. The third-party application(s) 130, for example, may provide software version analysis functionality that is supported by relevant functionality and data in the server system 108.

It is understood by people skilled in the art that multiple and other components may be included in the system 100. And entities marked by different numerals are only distinctive from each other logically and may not be physically.

Figure 2:
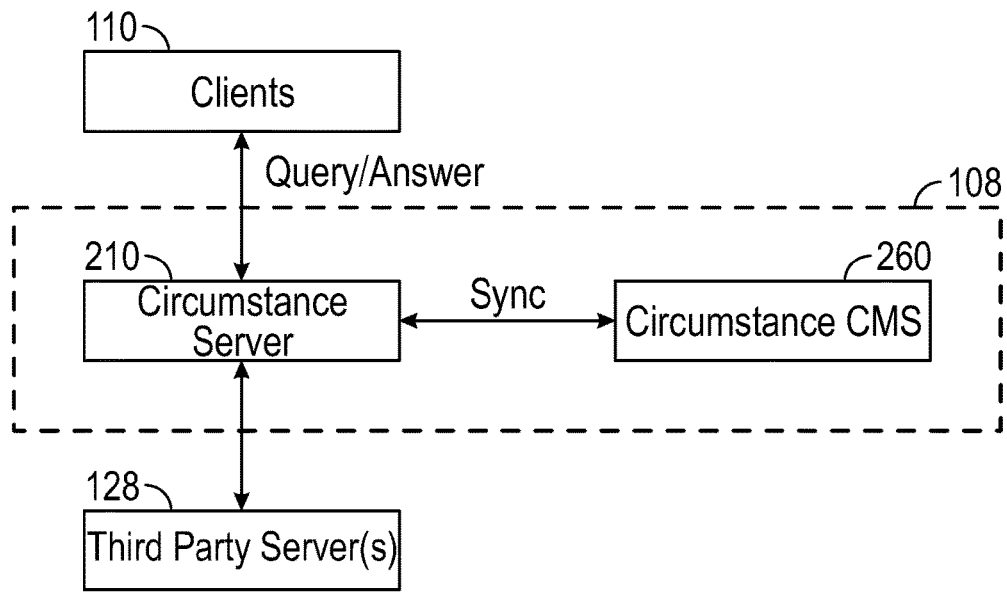
FIG. 2 is a block diagram further illustrating the server system according to some examples.

FIG. 2 is a block diagram further illustrating the server system according to some examples. Referring to FIG. 2, server system 108 includes two servers: circumstance engine 210 and circumstance CMS (content management system) 260. Circumstance engine 210 is the central decision-making point for client configuration. Circumstances engine 210 is the serving endpoint, which may be designed to handle million level QPS (query per second) according to some examples. When configuration requests are received from clients, circumstance engine 210 provides responses based on Configs and Config rules, which are initially provided by circumstance CMS 260, for example via streaming.

A Config is a decision to be made at run-time regarding the services requested by clients 110 according to some examples of the present disclosure. For example, the Config may be whether to enable a feature for a client device or a user, or, in the circumstance of content streaming, whether to prefetch video content for a particular user given the user service and/or other circumstance and so forth. The decision value of the Config may be one of a Boolean, scalar or more complex constructs. The final Config value provided by circumstance engine 210 to the client may be either definitive answers such as True or False, or still further Boolean, scalar or other complex constructs that need to be evaluated by other entities, which will be explained in further detail below.

A Config may be targeted by any number of Config rules. A Config rule is the value and decision criteria for the Config, represented as an arbitrarily complex Boolean expression. As Boolean expressions, Config rules may be represented by decision trees according to known art. For each Config, there may be arbitrary number of Config rules targeting it. That is, different set of conditions encapsulated in different Config rules may trigger the same Config. 1t is possible that after evaluation different Config rules may yield different or conflicting results. In such events, the circumstance engine may provide the whole set of the results to the client for further evaluation and/or provide rankings of all results according to known art.

Configs and Config rules are stored in database(s) managed by circumstance CMS 260. circumstance CMS 260 supports CRUD (create, read, update, and delete) operations on Config related entities via a web user interface. According to some examples, a specific data structure for Configs and Config rules may be created, wherein each instance of the Config is saved in a data row in database(s)/library managed by circumstance CMS 260. The Database(s)/library provide store the Configs and Config rules generated at circumstance CMS 260 by developers or other staff, and supply such via methods such as streaming. Circumstance engine 210 indexes all of the received Config and Config rules in its memory. The index is updated by subscribing to the circumstances CMS 260 database(s)/library. Circumstance engine 210 may synch the Configs and Config rules real time or via scheduled intervals, or other criteria.

In some examples, client 110 sends a service request over the network 102. The request is received by circumstance engine 210, where an evaluation on the corresponding Config is made. Corresponding Config rules are pulled for the evaluation. The Config rules may require knowledge on the server-side and/or knowledge on the client side. Circumstance engine 210 has and is able to access broad and rich knowledge about the client.

In some examples, circumstance engine 210 may access device profile database(s). Those databases may include a number of databases, such as device profile database storing device profiles, user profile database storing attributes related to the user, and so forth. Device profile database may contain static device properties, such as operating system version, mobile app version, device model, build flavor etc. Device profile database may further provide higher level device such as device cluster and/or device benchmarks. For example, a pipeline generates a mapping from device models to the device cluster and device benchmarks. User profile database may contain user profile properties such as recently used device model(s), bandwidth, frequency of certain services etc. Further, circumstance engine 210 also has access to third-party servers 128 for services, such as targeting signal services. Circumstance engine 210 may access targeting signal service to retrieve various information such as friend graph, user engagement metrics, and other user data.

However, despite the broad knowledge available to circumstance engine 210, there is information of which the server is not best situated to access. This includes information regarding the current status of the client. For example, the memory space, the battery status, the network conditions, whether the phone is being charged or not, and so forth. These types of dynamic information on the client change fast. For the most accurate information, the server will need to query from the client. This back-and-forth query between the server and client greatly reduces the efficiency of the server decision, prolonging the response time and depleting server resources. As the current industry benchmarks pushing for millisecond response time, repeated server and client queries are expensive and can be intolerable. As such the evaluation of Config rules is split between server and client according to the present disclosure.

Figure 3:
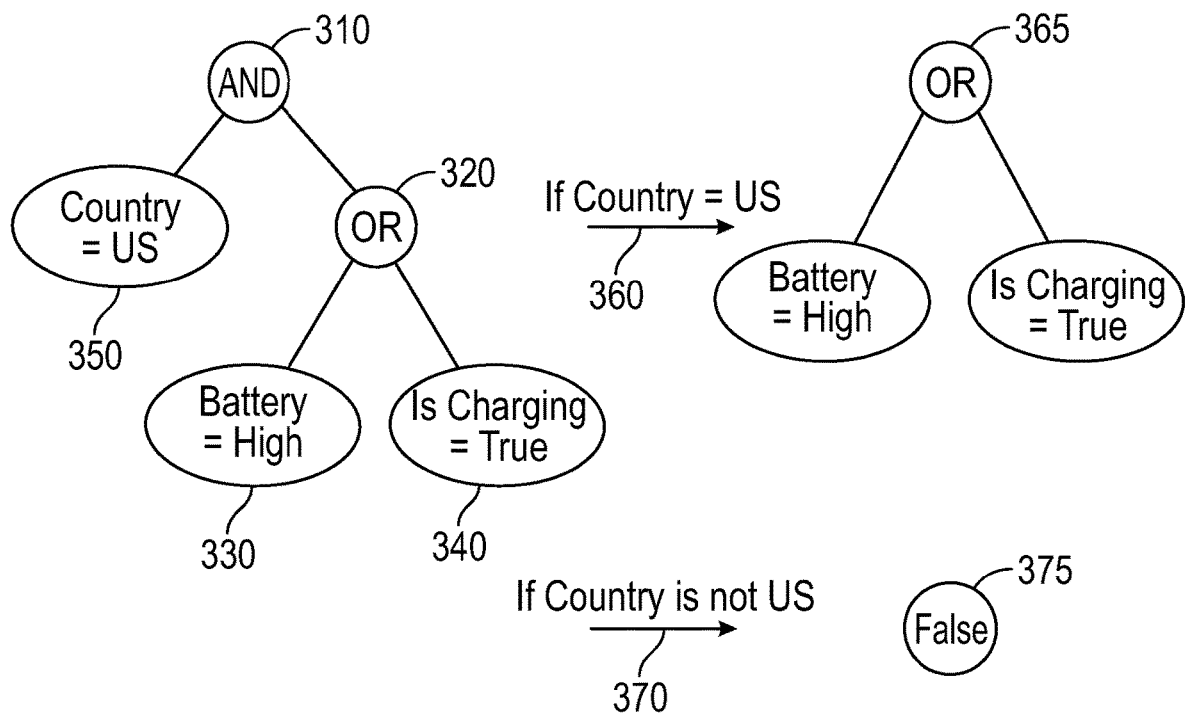
FIG. 3 is a diagram illustrating an example of a Config decision tree and the evaluation and pruning of the Config decision tree.
Figure 4:
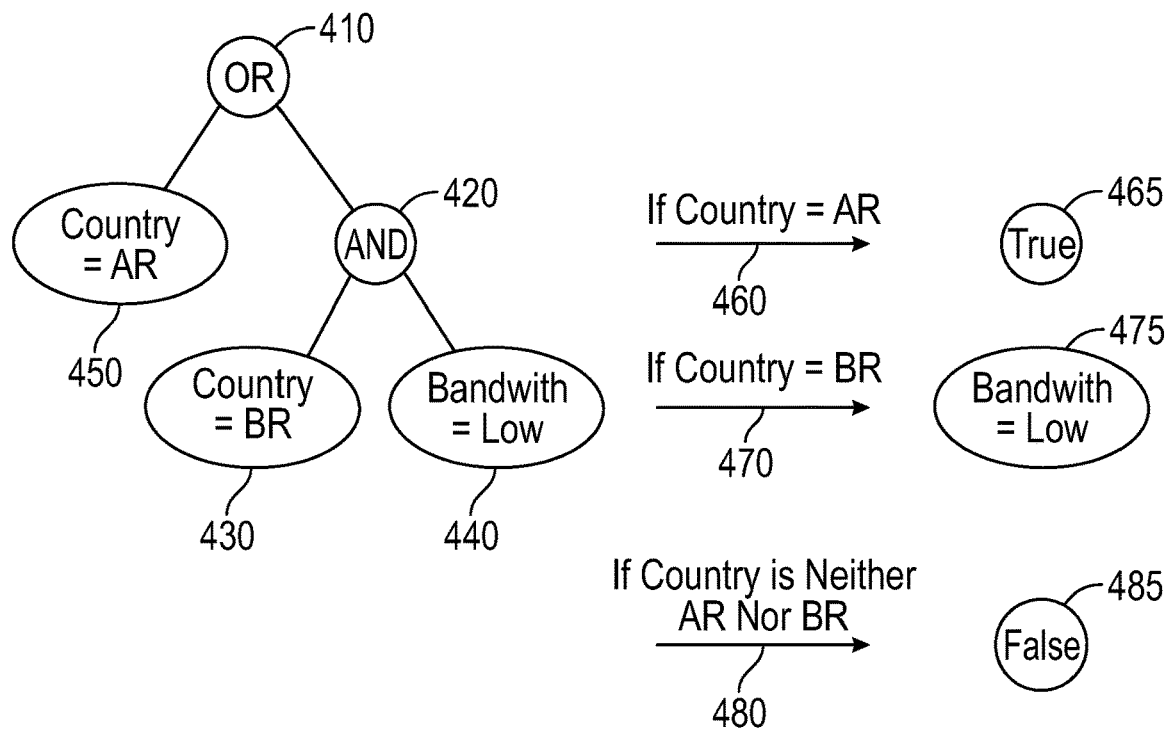
FIG. 4 is a diagram illustrating another example of a Config decision tree and the evaluation and pruning of the Config decision tree.

FIGS. 3-4 include an example of a decision tree representing a Config rule. Referring to FIG. 3, Config rule 300 is represented by a tree, which is a data structure well-known in the art. The root node of the tree 300 is a Boolean operator AND 310. The leaf nodes of the root operator AND 310 are a first-level leaf operator OR 320 and a first-level leaf condition 350, which are operands of the root Boolean operator AND 310. In this example, first-level leaf condition 350 specifies a condition of the country being the U.S. Underneath the leaf operator OR 320, there are two second-level leaf conditions: leaf condition 330, which specifies a battery condition of high, and leaf condition 340, which specifies a device condition of the phone is being charged. As such, FIG. 3 provides an example of the following Config rule for a client: the targeted Config will be evaluated as True if the country is U.S., and either the battery is high or the device is plugged-in.

FIG. 4 includes an example of a decision tree representing another Config rule. Referring to FIG. 4, Config rule 400 is represented by another tree. The root node of the tree 400 is a Boolean operator OR 410. The leaf nodes of the root operator OR 410 are first-level leaf operator AND 420 and first-level leaf condition 450, which are operands of the root Boolean operator AND 410. In this example, first-level leaf condition 450 specifies a condition of the country being Argentina (AR). Underneath the leaf operator AND 420, there are two second-level leaf conditions: leaf condition 430, which specifies a condition of the country being Brazil (BR), and leaf condition 440, which specifies a device condition of the bandwidth being low. As such, FIG. 4 provides an example of the following Config rule: the targeted Config will be evaluated as True if the country is either Argentina, or if the country is Brazil with a low bandwidth condition. People skilled in the art understand that the Config rule can be a Boolean decision tree or other constructs, wherein the Config Rule can be arbitrarily constructed.

As illustrated in FIGS. 3-4, Config rules may require both server and client information in order to be fully evaluated. In the example of FIG. 3, while the circumstance server 210 may have the country information, i.e. if the device is a U.S. device, due to the dynamic character of the device information, it may not have the current information regarding the device's battery level or if the device is plugged in. As such, for circumstance server 210 to render a definite decision, it will need to query the client for the current status of device. Similarly, in the example of FIG. 4, circumstances server 210 will need to query the client for its bandwidth condition because it can be changing instantaneously. As such, people skilled in the art understand that this back-and-forth queries between the server and the client will cause significant delays in providing client with the Config decision. As the state of the art pushing for decisions on the order of millisecond, such delays greatly crippled the user experience.

According to some examples of the present disclosure, the Config rule decision tree is split between the server circumstance engine 210 and client 110, based on which entity is best situated to provide the value to a variable of the Config rule decision tree. Accordingly, after the Config and Config rules regarding a client configuration query is retrieved, circumstance engine 210 will apply server-side knowledge, or server knowledge, to the Config rule decision tree. The server-side knowledge includes all knowledge known or accessible the server circumstance engine 210, as described above in connection with FIG. 2. Although the server may also have information on a client device, dynamic information known to the server that changes quickly and instantaneously is not reliable and not applied.

As such, as a result of the evaluation, there may be two outcomes. First, it is possible for circumstance engine 210 to derive a definitive decision, i.e. True or False, without any client knowledge despite being specified by a Config rule. For example, it is assumed in the disclosure that the country information is server information, and device's batter, plugging, and bandwidth information is client information. As such, in the example illustrated in FIG. 3, if the country is not U.S., identified by 370, the decision tree 300 will be evaluated as False, identified by 375. Likewise, in the example illustrated in FIG. 4, if the country is Argentina, identified by 460, the decision tree 400 will be evaluated as True, identified by 465. Or if the country is neither Argentina nor Brazil, identified by 480, the decision tree 400 will be evaluated as False 485. In those examples, by applying all server knowledge, circumstance engine 210 will derive a definite answer of True or False. When such is possible, circumstance engine 210 will no longer need client-side information and may push the results to the client for configuration.

On the other hand, if the circumstance engine 210 cannot fully evaluate the value of the Config rule, it will prune the decision tree by applying information accessible to it and returning the pruned tree to the client for evaluation. Again, going back to the examples in FIGS. 3-4, if the country is U.S., identified by 360 in FIG. 3, circumstance engine will not be able to derive a definitive answer of True or False. Instead, a pruned decision tree 365 that only contain questions for client-side information will be the outcome of the evaluation and returned to client 110. When client 110 receives the answer to its configuration query and finds that it is a decision tree, it will further apply its knowledge to the outcome. In this example, client will check the device's battery level and charging condition, then evaluate the pruned tree 465 accordingly. As such, a final definitive answer of True or False to the configuration can be derived.

Similarly, in evaluating the decision tree 400, when the only server knowledge is that the country is Brazil, identified by 470, the decision tree will be pruned by applying the country information. As a result, the pruned decision tree 475 of whether the Bandwidth is low is returned to client 110 for further evaluation. (People skilled in the art understand that decision tree 475 is a single node tree.) When client 110 receives the single node decision tree 475, it will check the device's bandwidth condition and apply it to the decision tree 475. As such, client 110 will derive a definitive answer of True of False to its configuration query.

As such, the need for back-and-forth queries between the server and the client is eliminated. Circumstance server 210 is freed from waiting for a response from the server and all the other resources and running time it needed to preserve an un-answered client query at the server.

Figure 5:
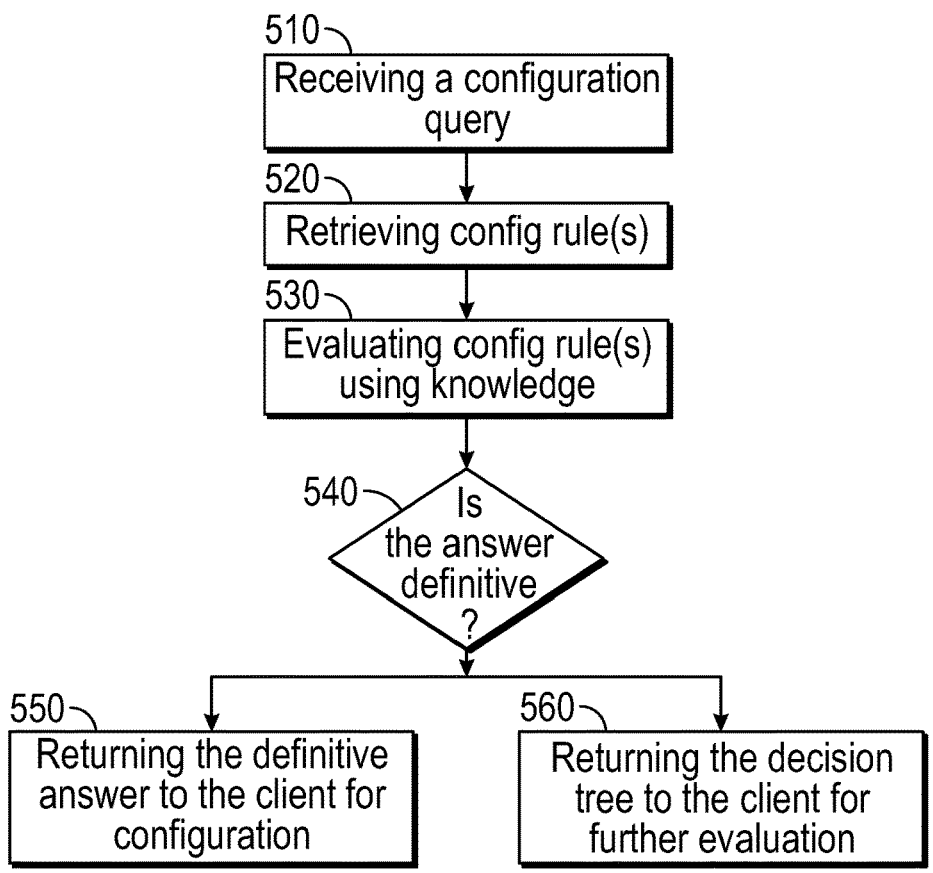
FIG. 5 is a flowchart illustrating an example method for splitting decision tree by a server.
Figure 6:
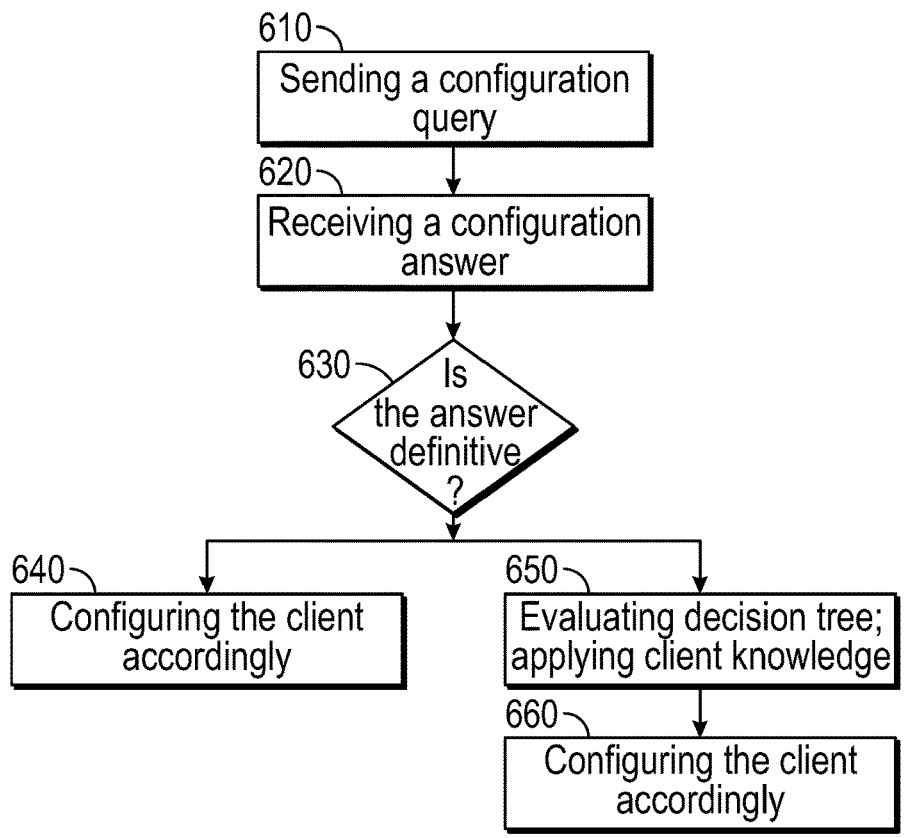
FIG. 6 is a flowchart illustrating an example method for splitting decision tree by a client.

FIGS. 5-6 provide flowcharts to further illustrate the tree-splitting decision process according to some examples. Although the following flowcharts may describe the operations as a sequential process, many of the operations can be performed in parallel or concurrently. In addition, the order of the operations may be re-arranged. A process is terminated when its operations are completed. A process may correspond to a method, a procedure, etc. The steps of method may be performed in whole or in part, may be performed in conjunction with some or all of the steps in other methods, and may be performed by any number of different systems, such as the systems described in the figures of the present disclosure.

FIG. 5 is a flow diagram illustrating an example method of splitting a decision tree by a server, according to some examples. Referring to FIG. 5, in step 510, circumstance engine 210 receives a client query and determine on a configuration to be provided to the client. In Step 520, circumstance engine 210 determines the one or more Config rules targeting the Config. In Step 530, circumstance engine 210 will evaluate the one or more Config rule(s). In this step, circumstance engine 210 will apply server-side knowledge to evaluate the Config rule(s). As described above, evaluation of the Config rule(s) involves the pruning of the decision trees that represents the Config rule(s). In Step 540, circumstance engine determines if a definitive answer, i.e. True or False, can be obtained by applying all server-side knowledge. In Step 550, if definitive answer(s) to the value of the Config rule(s) is obtained by applying all server-side knowledge, circumstance engine will provide the result to the client for the client to configure the device accordingly. On the other hand, in Step 560, if definitive answer(s) to the Config rules(s) cannot be obtained, circumstance engine will then provide the client with pruned decision tree(s) wherein all server-side knowledge is applied FIG. 6 is a flow diagram illustrating an example method of splitting tree by a client, according to some examples. Referring to FIG. 6, in Step 610 a client sends to server system a query for configuration. In Step 620, client receives a determination of the request it queried. In Step 630, client determines if the determination is a definitive answer to the configuration query. In Step 640, if the answer is definitive, i.e. True or False, client will configure the device accordingly. On the other hand, if in Step 650 the answer returned by the server system is a decision tree, client will then evaluate the decision tree using client-side knowledge. In Step 660, the client will configure accordingly.

Applying the methods described in FIGS. 5-6, the Config rule example illustrated in FIG. 3 will be evaluated as follows: In Step 510, circumstance engine receives a client query to configure the user device. In Step 520, circumstance engine determines the Config rule, which is if the country is U.S., and either the battery is high or the device is plugged-in. Under this rule, the evaluation of the decision tree requires the server-side knowledge of country and the client-side knowledge of battery condition and if the device is plugged-in. Accordingly, in Step 530 circumstance engine will evaluate the Config rule using server-side knowledge and prune the tree. After the evaluation, in Step 540, circumstance engine will determine if a definitive answer, i.e. True or False, is obtained solely using server-side knowledge. If the country is U.S., the method will divert to Step 560 and return the decision tree 365 as illustrated in FIG. 3 together with the Config. On the other hand, if the country is not U.S., a definitive answer of False can be derives without client-side knowledge of either the battery or the charging status of the device, the method will divert to Step 550 and return False to client.

Further referring to the example illustrated in FIGS. 3-4, a client sends a configuration query to the server system in Step 610. The client may or may not have the knowledge of circumstance engine. However, the server system will deliver the query to the circumstance engine. Using Steps 510-560 illustrated in the previous paragraph, circumstance engine returns its evaluation result to the client. In Step 620, client 110 receives the evaluation result. In Step 630, the client determines if the answer is definitive. For example, if the client is not in the U.S. and receives False 375 as illustrated in FIG. 3, or the country is Argentina and receives a True 465 as illustrated in FIG. 4, the method will divert to Step 640 and configure the device accordingly. On the other hand, if the client is in U.S. and receives the pruned decision tree 365 as illustrated in FIG. 3, the method will divert to Step 650 and use its local knowledge in determining the battery and charging status of the device to evaluate decision tree 365. For example, if the battery is high or the device is being charged, client will evaluate the decision tree 365 as True and configure the device accordingly. In Step 660, client will configure the device accordingly.

As described above, for a given request from client 110, there can be multiple matching Config Rules that have conflicting values. To resolve the issue, a ranking algorithm may be run against the all matching Config Rules to find the best match for the user according to one example of the present disclosure. According to an example, a number of metrics can be extracted for ranking the multiple matching Config Rules, such as the number of users that might be potentially impacted by the matching Config Rule.

Figure 7:
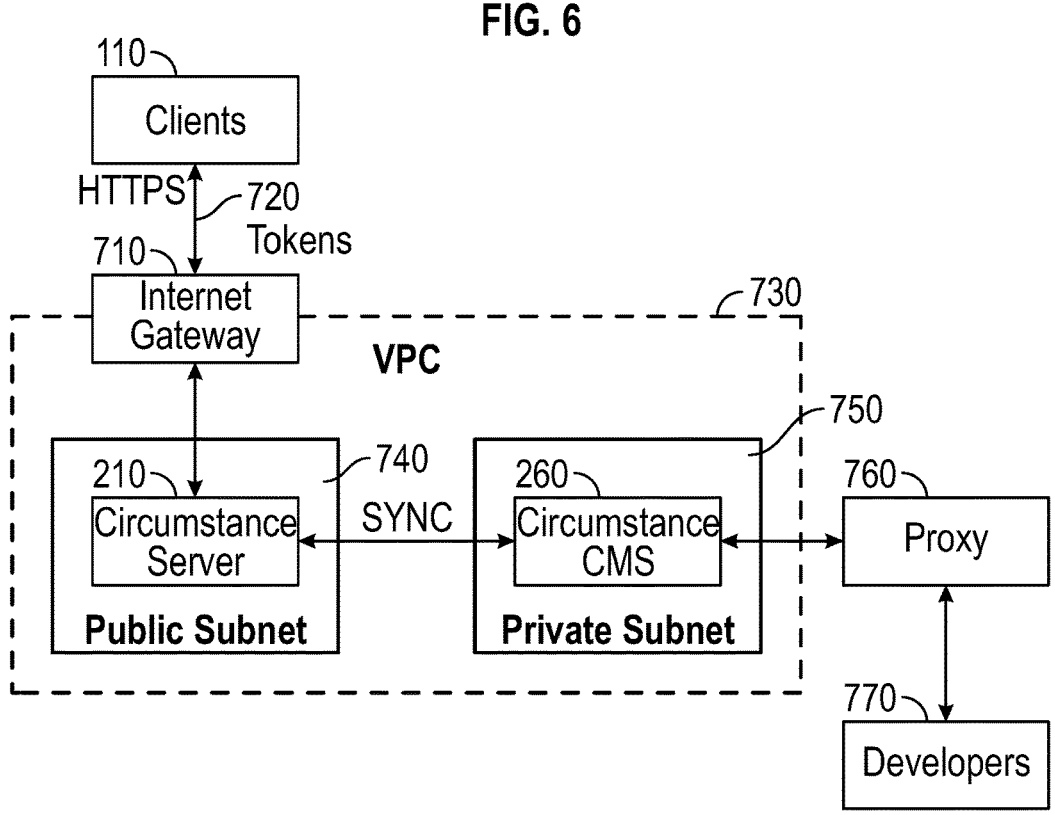
FIG. 7 is a diagram illustrating the security measures of the system according to some examples.

In order to provide a secured system, safeguards are incorporated into the system in some examples. FIG. 7 is a diagram illustrating the security measures of the system according to some examples. Referring to FIG. 7, when sending configuration queries or receiving answers to the queries, client 110 communicates with internet gateway 710. In addition to using secured internet protocols such as HTTPS (Hypertext Transfer Protocol Secure) in its communication with internet gateway 710, client 110 may also use authentication tokens 720 to further enhance the security of the communications. Internet gateway 710 is gateway to a cloud, such as virtual private cloud (VPC) 730. Within VPC 730, circumstance engine 210 is located in a public subnet 740, which can send outbound traffic directly to the internet; whereas the circumstance CMS 260 is in a private subnet 750, which is insulated from the internet. Circumstance CMS 260 is deployed behind a proxy server 760, which further insulates Circumstance CMS 260 from developers 770 who create, update and/or eliminate Configs and Config Rules. Each Config stored on Circumstance CMS has an owner list who can operate on it. Further granularity of authorizations may be given to different developers to further distinct the operation permissions Configs and Config Rules. For example, whitelists of users may be created to group users with regard to create, read, update and delete operations according to some examples.

Figure 8:
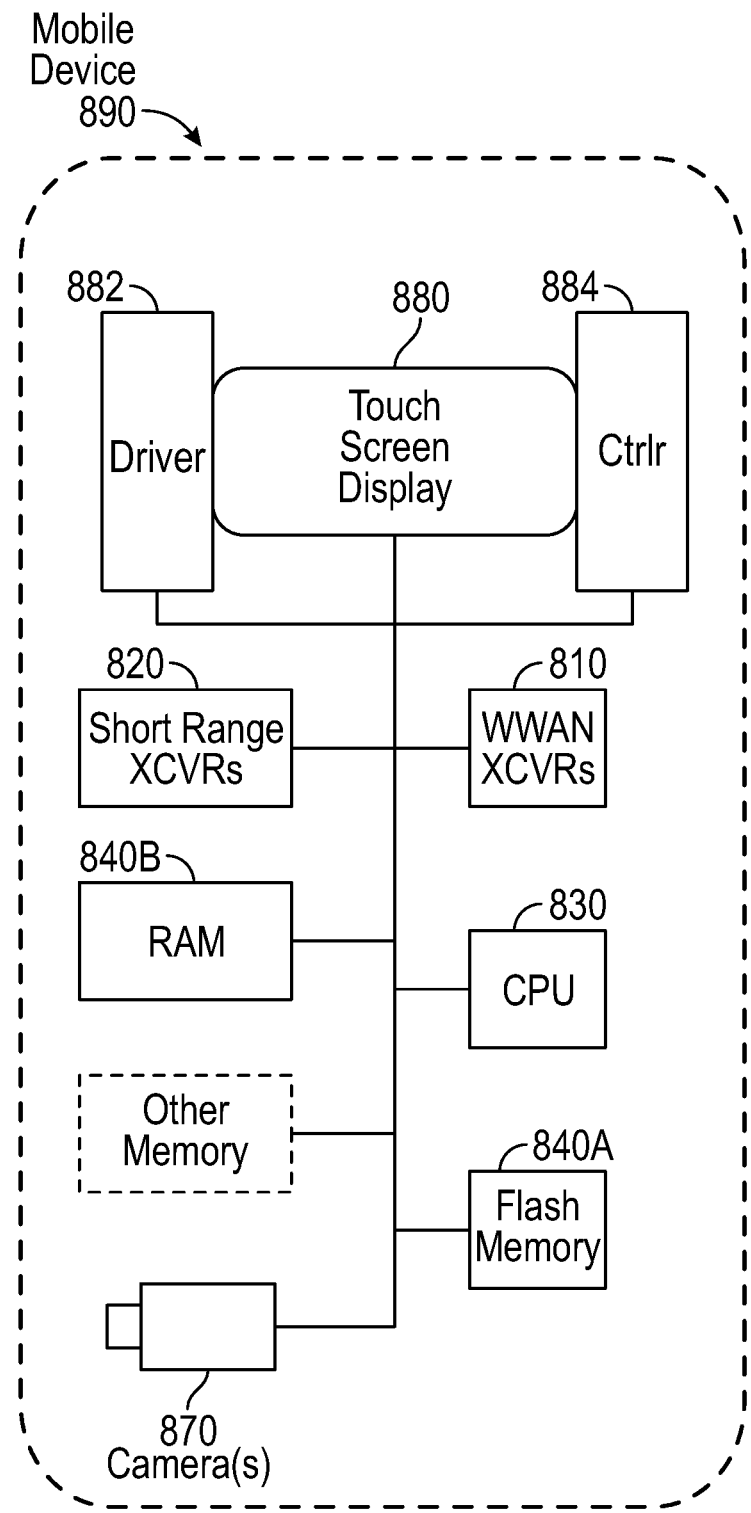
FIG. 8 is a diagrammatic representation of an example hardware configuration for a client device embodied as a mobile device.

FIG. 8 is a high-level functional block diagram of an example client device 110 embodied as an example mobile device 890. Mobile device 890 includes a flash memory 840A which includes programming to perform all or a subset of the functions described herein. Mobile device 890 can include a camera 870 that comprises at least two visible light cameras (first and second visible light cameras with overlapping fields of view) or at least on visible light camera and a depth sensor with substantially overlapping fields of view. Memory 840A may further include multiple images or video, which are generated via the camera 870.

As shown, the mobile device 890 includes an image display 880, an image display driver 882 to control the image display 880, and a controller 884. In the example of FIG. 8, the image display 880 and a user input device are integrated together into a touch screen display.

Examples of touch screen type mobile devices that may be used include (but are not limited to) a smart phone, a personal digital assistant (PDA), a tablet computer, a laptop computer, or other portable device. However, the structure and operation of the touch screen type devices is provided by way of example; and the subject technology as described herein is not intended to be limited thereto. For purposes of this discussion, FIG. 8 therefore provides block diagram illustrations of the example mobile device 890 having a touch screen display for displaying content and receiving user input as (or as part of) the user interface.

As shown in FIG. 8, the mobile device 890 includes at least one digital transceiver (XCVR) 810, shown as WWAN XCVRs, for digital wireless communications via a wide area wireless mobile communication network. The mobile device 890 also includes additional digital or analog transceivers, such as short range XCVRs 820 for short-range network communication, such as via NFC, VLC, DECT, ZigBee, Bluetooth™, or WiFi. For example, short range XCVRs 820 may take the form of any available two-way wireless local area network (WLAN) transceiver of a type that is compatible with one or more standard protocols of communication implemented in wireless local area networks, such as one of the Wi-Fi standards under IEEE 802.11.

To generate location coordinates for positioning of the mobile device 890, the mobile device 890 can include a global positioning system (GPS) receiver. Alternatively, or additionally the mobile device 890 can utilize either or both the short range XCVRs 820 and WWAN XCVRs 810 for generating location coordinates for positioning. For example, cellular network, WiFi, or Bluetooth™ based positioning systems can generate very accurate location coordinates, particularly when used in combination. Such location coordinates can be transmitted to the eyewear device over one or more network connections via XCVRs 810, 820.

The transceivers 810, 820 (network communication interface) conforms to one or more of the various digital wireless communication standards utilized by modern mobile networks. Examples of WWAN transceivers 810 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 810, 820 provide two-way wireless communication of information including digitized audio signals, still image and video signals, web page information for display as well as web related inputs, and various types of mobile message communications to/from the mobile device 890.

The mobile device 890 further includes a microprocessor, shown as CPU 830, sometimes referred to herein as the host controller. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 830, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU 830 or processor hardware in smartphone, laptop computer, and tablet.

The microprocessor 830 serves as a programmable host controller for the mobile device 890 by configuring the mobile device 890 to perform various operations, for example, in accordance with instructions or programming executable by processor 830. For example, such operations may include various general operations of the mobile device. Although a processor may be configured by use of hardwired logic, typical processors in mobile devices are general processing circuits configured by execution of programming.

The mobile device 890 includes a memory or storage device system, for storing data and programming. In the example, the memory system may include a flash memory 840A and a random access memory (RAM) 840B. The RAM 840B serves as short term storage for instructions and data being handled by the processor 830, e.g., as a working data processing memory. The flash memory 840A typically provides longer term storage.

Hence, in the example of mobile device 890, the flash memory 840A is used to store programming or instructions for execution by the processor 830. Depending on the type of device, the mobile device 890 stores and runs a mobile operating system through which specific applications. Applications may be a native application, a hybrid application, or a web application (e.g., a dynamic web page executed by a web browser) that runs on mobile device 890. Examples of mobile operating systems include Google Android, Apple iOS (I-Phone or iPad devices), Windows Mobile, Amazon Fire OS, RIM BlackBerry operating system, or the like.

Figure 9:
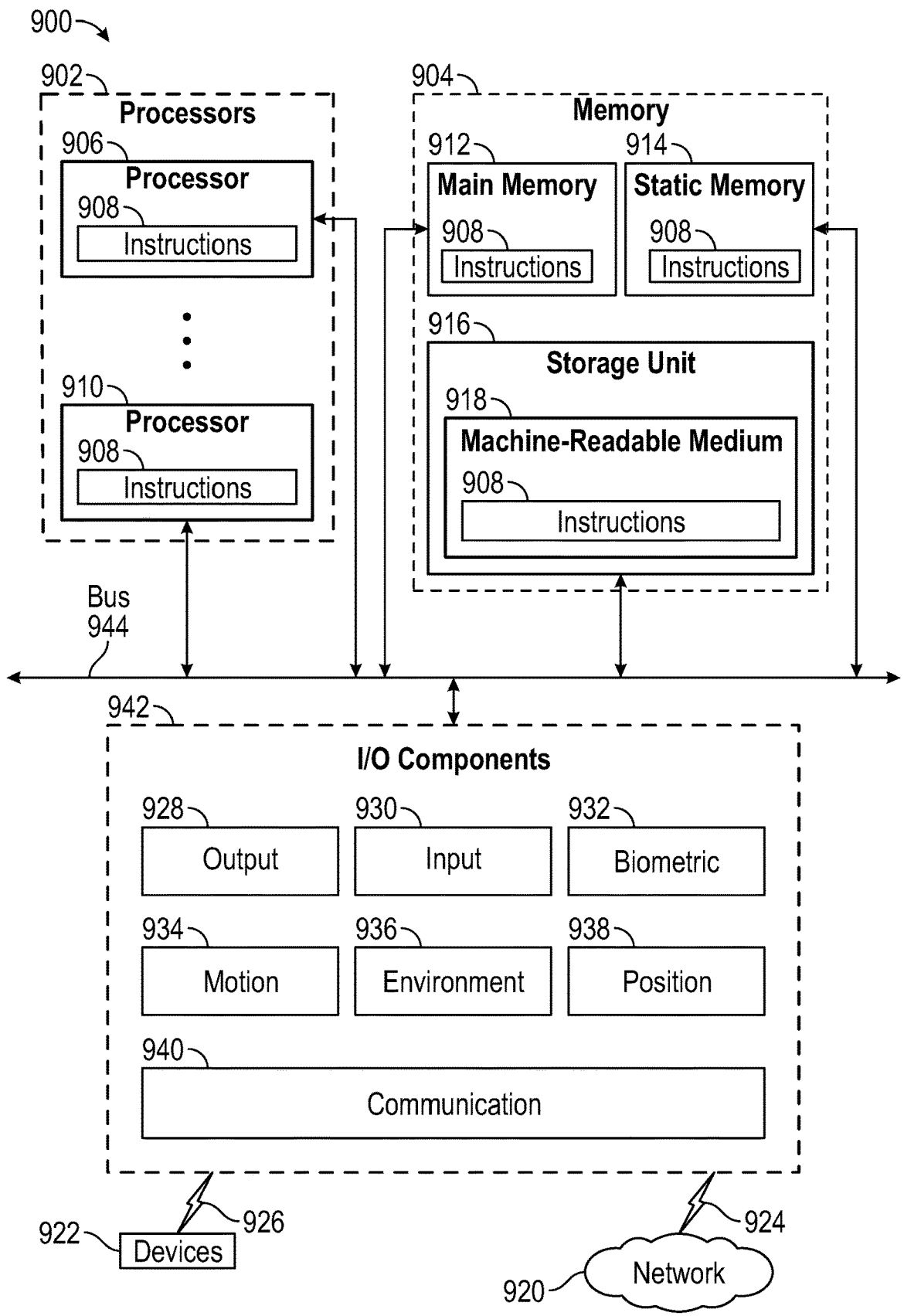
FIG. 9 is a diagrammatic representation of a machine in the form of a computer system within which a set of instructions may be executed for causing the machine to perform any one or more of the methodologies described herein, in accordance with some examples.

FIG. 9 is a diagrammatic representation of a machine 900 within which instructions 908 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment.

The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein.

The machine 900 may include processors 902, memory 904, and I/O components 942, which may be configured to communicate with each other via a bus 944. In an example, the processors 902 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single core, a single processor with multiple cores (e.g., a multi-core processor), multiple processors with a single core, multiple processors with multiples cores, or any combination thereof.

The memory 904 includes a main memory 912, a static memory 914, and a storage unit 916, both accessible to the processors 902 via the bus 944. The main memory 904, the static memory 914, and storage unit 916 store the instructions 908 embodying any one or more of the methodologies or functions described herein. The instructions 908 may also reside, completely or partially, within the main memory 912, within the static memory 914, within machine-readable medium 918 (e.g., a non-transitory machine-readable storage medium) within the storage unit 916, within at least one of the processors 902 (e.g., within the processor's cache memory), or any suitable combination thereof, during execution thereof by the machine 900.

Furthermore, the machine-readable medium 918 is non-transitory (in other words, not having any transitory signals) in that it does not embody a propagating signal. However, labeling the machine-readable medium 918 "non-transitory" should not be construed to mean that the medium is incapable of movement; the medium should be considered as being transportable from one physical location to another. Additionally, since the machine-readable medium 918 is tangible, the medium may be a machine-readable device.

The I/O components 942 may include a wide variety of components to receive input, provide output, produce output, transmit information, exchange information, capture measurements, and so on. The specific I/O components 942 that are included in a particular machine will depend on the type of machine. For example, portable machines such as mobile phones may include a touch input device or other such input mechanisms, while a headless server machine will likely not include such a touch input device. It will be appreciated that the I/O components 942 may include many other components that are not shown in FIG. 9. In various examples, the I/O components 942 may include output components 928 and input components 930. The output components 928 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 930 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location, force of touches or touch gestures, or other tactile input components), audio input components (e.g., a microphone), and the like.

In further examples, the I/O components 942 may include biometric components 932, motion components 934, environmental components 936, or position components 938, among a wide array of other components. For example, the biometric components 932 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 934 include acceleration sensor components (e.g., accelerometer), gravitation sensor components, rotation sensor components (e.g., gyroscope), and so forth. The environmental components 936 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 942 further include communication components 940 operable to couple the machine 900 to a network 920 or devices 922 via a coupling 924 and a coupling 926, respectively. For example, the communication components 940 may include a network interface component or another suitable device to interface with the network 920. In further examples, the communication components 940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 922 may be another machine or any of a wide variety of peripheral devices (e.g., a peripheral device coupled via a USB).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geolocation, location via Wi-Fi® signal triangulation, location via detecting an NFC beacon signal that may indicate a particular location, and so forth.

The various memories (e.g., memory 904, main memory 912, static memory 914, memory of the processors 902), storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed examples.

The instructions 908 may be transmitted or received over the network 920, using a transmission medium, via a network interface device (e.g., a network interface component included in the communication components 940) and using any one of a number of well-known transfer protocols (e.g., hypertext transfer protocol (HTTP)). Similarly, the instructions 908 may be transmitted or received using a transmission medium via the coupling 926 (e.g., a peer-to-peer coupling) to the devices 922.

Figure 10:
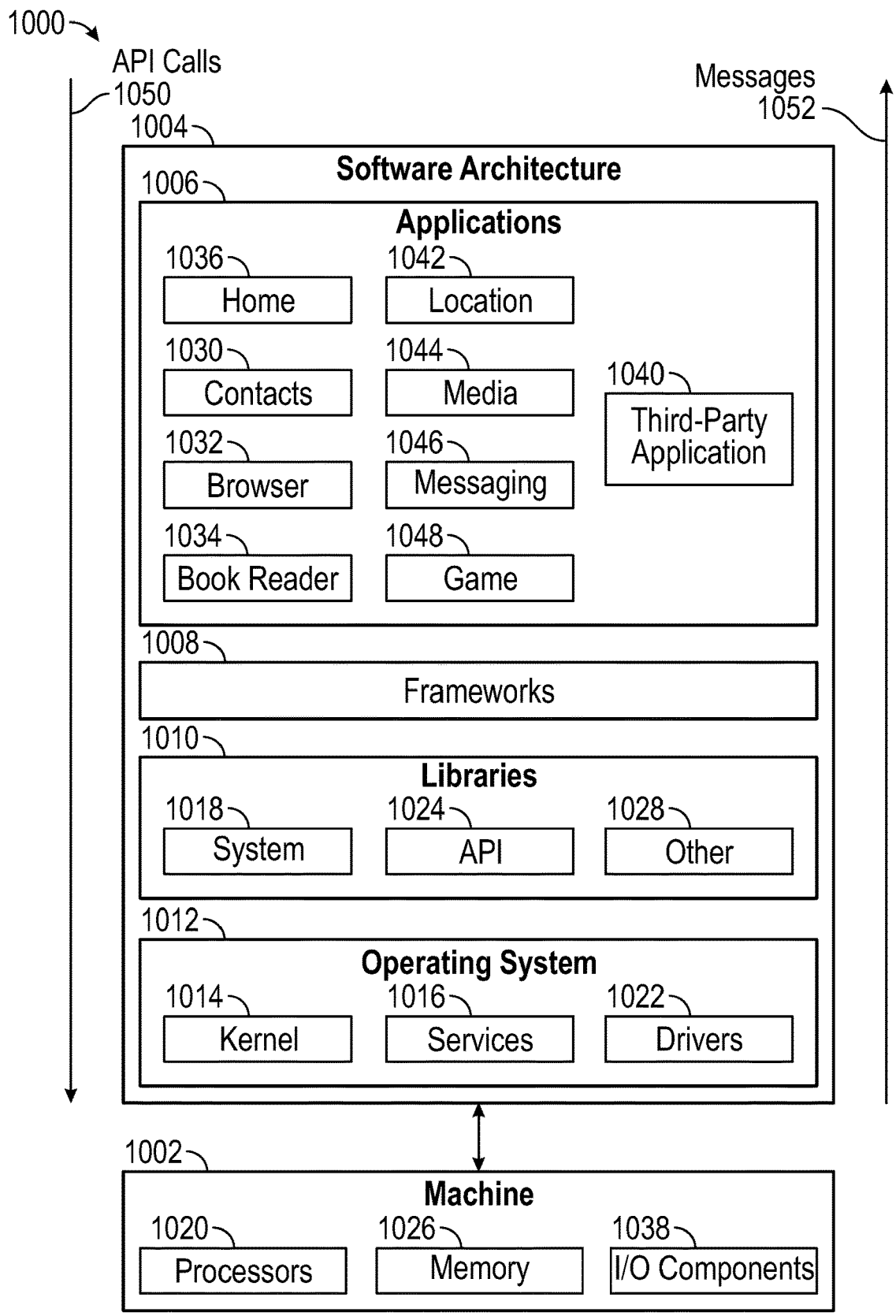
FIG. 10 is block diagram showing a software architecture within which aspects of the present disclosure may be implemented, in accordance with some examples.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1010 provide a low-level common infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a high-level common infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system.

In this example, the third-party application 1040 can invoke the API calls 1050 provided by the operating system 1012 to facilitate functionality described herein.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like, whether or not qualified by a term of degree (e.g. approximate, substantially or about), may vary by as much as ±10% from the recited amount.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

What is claimed is:

1. A method comprising:
   receiving, by a server, a configuration query from a client;
   retrieving, by the server, at least one Config rule represented by a decision tree according to the configuration query, wherein the Config is a run-time decision regarding the configuration query;
   retrieving, by the f-server, server knowledge relevant to the at least one Config rule;
   evaluating, by the server, the at least one Config rule based on the server knowledge;
   providing, by the server, a response to the configuration query based on the evaluating, and
   receiving, by the client, the response to the configuration query;
   wherein if a definitive answer is not derived by applying the server knowledge to the at least one Config rule:
      pruning the decision tree representing said Config rule using the server knowledge; and
      providing the pruned decision tree as a part of the response to the client, and
   wherein if the response is the pruned decision tree:
      evaluating, by the client, the pruned decision tree by applying client knowledge, and
      deriving, by the client, a decision to the configuration query.

2. The method of claim 1, wherein the client knowledge comprising information stored by the client and provided by a user of the client.

3. The method of 1, further comprising:
   wherein if more than one Config rule is retrieved:
      ranking the more than one evaluated Config rule.

4. The method of claim 1, wherein if a definitive answer is derived by applying server knowledge to the Config rule:
   providing the definitive answer as a part of the response to the client.

5. The method of claim 1, wherein the server knowledge comprising information stored by the server, at least streamed from one or more second servers or retrieved from one or more third-party servers.

6. The method of claim 1, wherein the Config rule targets a Config, said Config representing a run-time configuration decision.

7. The method of claim 1, wherein a definitive answer is one of a Boolean True and False.

8. The method of claim 1, wherein the Config rule is streamed from another server.

9. A system comprising:
   a memory that stores instructions; and
   a processor configured by the instructions to perform operations comprising:
      receiving, by a server, configuration query from a client;
      retrieving, by the server, at least one Config rule represented by a decision tree according to the configuration query, wherein the Config is a run-time decision regarding the configuration query;
      retrieving, by the server, server knowledge relevant to the at least one Config rule;
      evaluating, by the server, the at least one Config rule based on the server knowledge;
      providing, by the server, a response to the configuration query based on the evaluating; and
      receiving, by the client, the response to the configuration query;
      wherein if a definitive answer is not derived by applying server knowledge to the at least one Config rule:
         pruning the decision tree representing said Config rule using the server knowledge; and
         providing the pruned decision tree as a part of the response to the client, and
      wherein if the response is the pruned decision tree:
         evaluating, by the client, the pruned decision tree by applying client knowledge; and
         deriving, by the client, a decision to the configuration query.

10. The system of claim 9, wherein the processor configured by the instructions to perform operations further comprising:
    wherein if more than one Config rule is retrieved:
       ranking the more than one evaluated Config rule.

11. The system of claim 9, wherein if a definitive answer is derived by applying server knowledge to the Config rule:
    providing the definitive answer as a part of the response to the client.

12. The system of claim 9, wherein the serer knowledge comprising information stored by the server, at least streamed from one or more second servers or retrieved from one or more third-party servers.

13. The system of claim 9, wherein the client knowledge comprising information stored by the client and provided by a user of the client.

14. The system of claim 9, wherein the Config rule targets a Config, said Config representing a run-time configuration decision.

15. The system of claim 9, wherein a definitive answer is one of a Boolean True and False.

16. The system of claim 9, wherein the Config is streamed from another server.

17. A non-transitory processor-readable storage medium storing processor-executable instructions that, when executed by a processor of a machine, cause the machine to perform operations comprising:

receiving, by a server, configuration query from a client;
  retrieving, by the server, at least one Config rule represented by a decision tree according to the configuration query, wherein the Config is a run-time decision regarding the configuration query;
    retrieving, by the first server, knowledge relevant to the at least one Config rule;
  evaluating, by the server, the at least one Config rule based on the server knowledge;
  providing, by the server, a response to the configuration query based on the evaluating; and
  receiving, by the client, the response to the configuration query;
  wherein if a definitive answer is not derived by applying the server knowledge to the at least one Config rule:
    pruning the decision tree representing said Config rule using server knowledge; and
    providing the pruned decision tree as a part of the response to the client, and
  wherein if the response is the pruned decision tree:
    evaluating, by the client, the pruned decision tree by applying client knowledge; and
    deriving, by the client a decision to the configuration query.

* * * * *